US011465463B2

(12) United States Patent
Lanuzel et al.

(10) Patent No.: US 11,465,463 B2
(45) Date of Patent: Oct. 11, 2022

(54) TRANSPORT REFRIGERATION UNIT

(71) Applicant: CARRIER CORPORATION, Farmington, CT (US)

(72) Inventors: Ludovic Lanuzel, Bonsecours (FR); Philippe Thierry Vaas, Mesnil Raoul (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/553,092

(22) PCT Filed: Feb. 23, 2015

(86) PCT No.: PCT/IB2015/000492
§ 371 (c)(1),
(2) Date: Aug. 23, 2017

(87) PCT Pub. No.: WO2016/135524
PCT Pub. Date: Sep. 1, 2016

(65) Prior Publication Data
US 2018/0264909 A1    Sep. 20, 2018

(51) Int. Cl.
*B60H 1/00* (2006.01)
*B60H 1/32* (2006.01)
(Continued)

(52) U.S. Cl.
CPC ..... *B60H 1/00014* (2013.01); *B60H 1/00521* (2013.01); *B60H 1/3229* (2013.01);
(Continued)

(58) Field of Classification Search
CPC . F25D 19/003; F25D 17/067; B60H 1/00014; B60H 1/3229; B60H 1/00521; B60H 1/3232
See application file for complete search history.

(56) References Cited

U.S. PATENT DOCUMENTS 4,399,737 A * 8/1983 Severson ................. B60P 3/20
165/41
4,672,818 A * 6/1987 Roth .................. B60H 1/00364
62/239
(Continued)

FOREIGN PATENT DOCUMENTS

DE    102008005539 A1    1/2009

OTHER PUBLICATIONS

International Search Report for International Application No. PCT/IB2015/000492; International Filing Date Feb. 23, 2015; dated Nov. 2, 2015, 5 pages.
(Continued)

*Primary Examiner* — Kun Kai Ma
(74) *Attorney, Agent, or Firm* — Cantor Colburn LLP (57) ABSTRACT

A transportation refrigeration unit (24) to provide a flow of supply air to a selected space includes a compressor to compress a flow of refrigerant and an engine (36) powered by a flow of fuel and operably connected to the compressor to drive the compressor. An evaporator circulates the flow of refrigerant therethrough to cool the supply air and includes a substantially unitary evaporator housing (50) having a supply air inlet opening (52) and a supply air outlet opening (56). An evaporator coil (32) is located in the evaporator housing, the flow of refrigerant circulating across the evaporator coil. An evaporator fan (34) is located in the evaporator housing to urge the supply airflow into the evaporator housing via the supply air inlet opening (52), across the evaporator coil (32) and out of the evaporator housing through the supply air outlet opening (56). The evaporator fan (34) can be located upstream or downstream of the evaporator coil (32).

17 Claims, 6 Drawing Sheets

(51) Int. Cl.
*F25D 17/06* (2006.01)
*F25D 19/00* (2006.01)

(52) U.S. Cl.
CPC ......... *B60H 1/3232* (2013.01); *F25D 17/067* (2013.01); *F25D 19/003* (2013.01)

(56) References Cited

U.S. PATENT DOCUMENTS

| | | | | |
|---|---|---|---|---|
| 4,732,011 | A * | 3/1988 | Haiya | B60H 1/00371 62/244 |
| 4,912,940 | A * | 4/1990 | Anderson | B60H 1/3227 62/239 |
| 5,531,264 | A * | 7/1996 | Eike | B60H 1/00014 165/42 |
| 6,105,383 | A * | 8/2000 | Reimann | B60H 1/00371 62/244 |
| 6,161,609 | A * | 12/2000 | Ahn | B60H 1/00378 165/122 |
| 6,279,334 | B1 | 8/2001 | Ishikawa et al. | |
| 6,318,109 | B1 * | 11/2001 | Reimann | B60H 1/00371 62/244 |
| 6,523,363 | B1 * | 2/2003 | Gully | B60H 1/00514 62/285 |
| 6,601,639 | B2 | 8/2003 | Shibata | |
| 6,694,765 | B1 | 2/2004 | Waldschmidt et al. | |
| 6,763,670 | B1 * | 7/2004 | Bushnell | B60H 1/00371 62/200 |
| 7,013,656 | B2 | 3/2006 | Yanagimachi et al. | |
| 7,434,611 | B2 * | 10/2008 | Wunderlich | B60H 1/00207 165/202 |
| 7,614,242 | B1 * | 11/2009 | Quesada Saborio | B60H 1/3232 62/298 |
| 7,907,408 | B2 | 3/2011 | Ippoushi et al. | |
| 7,921,659 | B2 | 4/2011 | Quesada Saborio | |
| 8,869,547 | B2 | 10/2014 | Nishino et al. | |
| 9,272,600 | B2 * | 3/2016 | Melbostad | B60H 1/00371 |
| 2004/0020228 | A1 * | 2/2004 | Waldschmidt | F25D 19/02 62/234 |
| 2005/0072175 | A1 | 4/2005 | Umeo et al. | |
| 2005/0126216 | A1 * | 6/2005 | Hammonds | B60H 1/00371 62/515 |
| 2008/0127666 | A1 | 6/2008 | Major et al. | |
| 2008/0282729 | A1 | 11/2008 | Mola et al. | |
| 2010/0006257 | A1 | 1/2010 | Schutz | |
| 2011/0011115 | A1 * | 1/2011 | Bushnell | B60H 1/00014 62/323.3 |
| 2011/0162395 | A1 * | 7/2011 | Chakiachvili | B60H 1/00014 62/115 |
| 2013/0247605 | A1 | 9/2013 | Laudet | |
| 2014/0331710 | A1 | 11/2014 | Frohling et al. | |

OTHER PUBLICATIONS

Written Opinion for International Application No. PCT/IB2015/000492; International Filing Date Feb. 23, 2015 dated Nov. 2, 2015, 5 pages.

* cited by examiner

TRANSPORT REFRIGERATION UNIT

CROSS REFERENCE TO RELATED APPLICATIONS

This application is a National Stage application of PCT/IB2015/000492, filed Feb. 23, 2015, the entire contents of which are hereby incorporated by reference.

BACKGROUND OF THE INVENTION

The subject matter disclosed herein relates to refrigeration systems. More specifically, the subject matter disclosed herein relates to refrigeration of truck cargo compartments utilized to store and ship cargo.

A typical refrigerated cargo container or refrigerated truck trailer, such as those utilized to transport a cargo via rail or road, is a container modified to include a refrigeration unit located at one end of the container. The refrigeration unit includes a compressor, condenser, expansion valve and evaporator serially connected by refrigerant lines in a closed refrigerant circuit in accord with known refrigerant vapor compression cycles. The evaporator is located at least partially in a compartment that requires cooling, such as a cargo compartment of a truck or trailer. The condenser and compressor are located outside of the compartment. Cargo compartment air is passed over the coils of the evaporator, boiling the refrigerant flowing through the evaporator coil, thus heat is absorbed from the air in the conditioned compartment to cool the conditioned compartment. The gaseous refrigerant is then flowed to the compressor for compression thereat. A power unit, including an engine, drives the compressor of the refrigeration unit, and is typically diesel powered, or in other applications natural gas powered. In many truck/trailer transport refrigeration systems, the compressor is driven by the engine shaft either through a belt drive or by a mechanical shaft-to-shaft link. In other systems, the engine drives a generator that generates electrical power, which in turn drives the compressor.

In a typical transport refrigeration unit, the evaporator assembly includes the evaporator coil and a number of blowing fans to blow the cargo compartment air over the housing, which are located in an evaporator housing. The evaporator housing is typically a metal enclosure, formed from many parts which are screwed together as components such as the evaporator coil and blowing fans are installed in the housing. Such a configuration is time consuming and costly to assemble and drives limitations on the type of fan, blowing fans, used in the evaporator assembly.

BRIEF DESCRIPTION OF THE INVENTION

In one embodiment, a transportation refrigeration unit to provide a flow of supply air to a selected space includes a compressor to compress a flow of refrigerant and an engine powered by a flow of fuel and operably connected to the compressor to drive the compressor. An evaporator circulates the flow of refrigerant therethrough to cool the supply air and includes a substantially unitary evaporator housing having a supply air inlet opening and a supply air outlet opening. An evaporator coil is located in the evaporator housing, the flow of refrigerant circulating across the evaporator coil. An evaporator fan is located in the evaporator housing to urge the supply airflow into the evaporator housing via the supply air inlet opening, across the evaporator coil and out of the evaporator housing through the supply air outlet opening.

Additionally or alternatively, in this or other embodiments the evaporator fan is located downstream of the evaporator coil relative to a direction of the supply airflow.

Additionally or alternatively, in this or other embodiments the evaporator fan is secured to a fan deck formed integral with the evaporator housing.

Additionally or alternatively, in this or other embodiments the evaporator fan is four evaporator fans.

Additionally or alternatively, in this or other embodiments a removable top cover is affixed to the evaporator housing.

Additionally or alternatively, in this or other embodiments the evaporator fan is secured to a fan deck affixed to the top cover.

Additionally or alternatively, in this or other embodiments the evaporator housing is formed from a plastic or composite material.

Additionally or alternatively, in this or other embodiments the evaporator fan is located upstream of the evaporator coil relative to a direction of the supply airflow.

Additionally or alternatively, in this or other embodiments a partition is positioned between the evaporator and the condenser, the partition formed integral to the evaporator housing.

In another embodiment, an evaporator assembly for a transportation refrigeration unit includes a substantially unitary evaporator housing having a supply air inlet opening and a supply air outlet opening. An evaporator coil is located in the evaporator housing circulating a flow of refrigerant therethrough. An evaporator fan is positioned in the evaporator housing to urge the supply air into the evaporator housing via the supply air inlet opening, across the evaporator coil and out of the evaporator housing through the supply air outlet opening.

Additionally or alternatively, in this or other embodiments the evaporator fan is located downstream of the evaporator coil relative to a direction of the supply airflow.

Additionally or alternatively, in this or other embodiments the evaporator fan is secured to a fan deck formed integral with the evaporator housing.

Additionally or alternatively, in this or other embodiments the evaporator fan is four evaporator fans.

Additionally or alternatively, in this or other embodiments a removable top cover is affixed to the evaporator housing.

Additionally or alternatively, in this or other embodiments the evaporator fan is secured to a fan deck affixed to the top cover.

Additionally or alternatively, in this or other embodiments the evaporator housing is formed from a plastic or composite material.

Additionally or alternatively, in this or other embodiments the evaporator fan is located upstream of the evaporator coil relative to a direction of the supply airflow.

In yet another embodiment, a refrigerated truck includes a truck having a cargo compartment and a refrigeration unit operably connected to the cargo compartment to provide a flow of supply airflow to the cargo compartment. The refrigeration unit includes a compressor to compress a flow of refrigerant and an engine powered by a flow of fuel and operably connected to the compressor to drive the compressor. An evaporator circulates the flow of refrigerant therethrough to cool the supply air and includes a substantially unitary evaporator housing having a supply air inlet opening and a supply air outlet opening, an evaporator coil positioned in the evaporator housing, the flow of refrigerant circulating across the evaporator coil, and an evaporator fan located in the evaporator housing to urge the supply airflow into the evaporator housing via the supply air inlet opening, across the evaporator coil and out of the evaporator housing through the supply air outlet opening.

Additionally or alternatively, in this or other embodiments the evaporator fan is located downstream of the evaporator coil relative to a direction of the supply airflow.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawing.

DETAILED DESCRIPTION OF THE INVENTION

Figure 1:
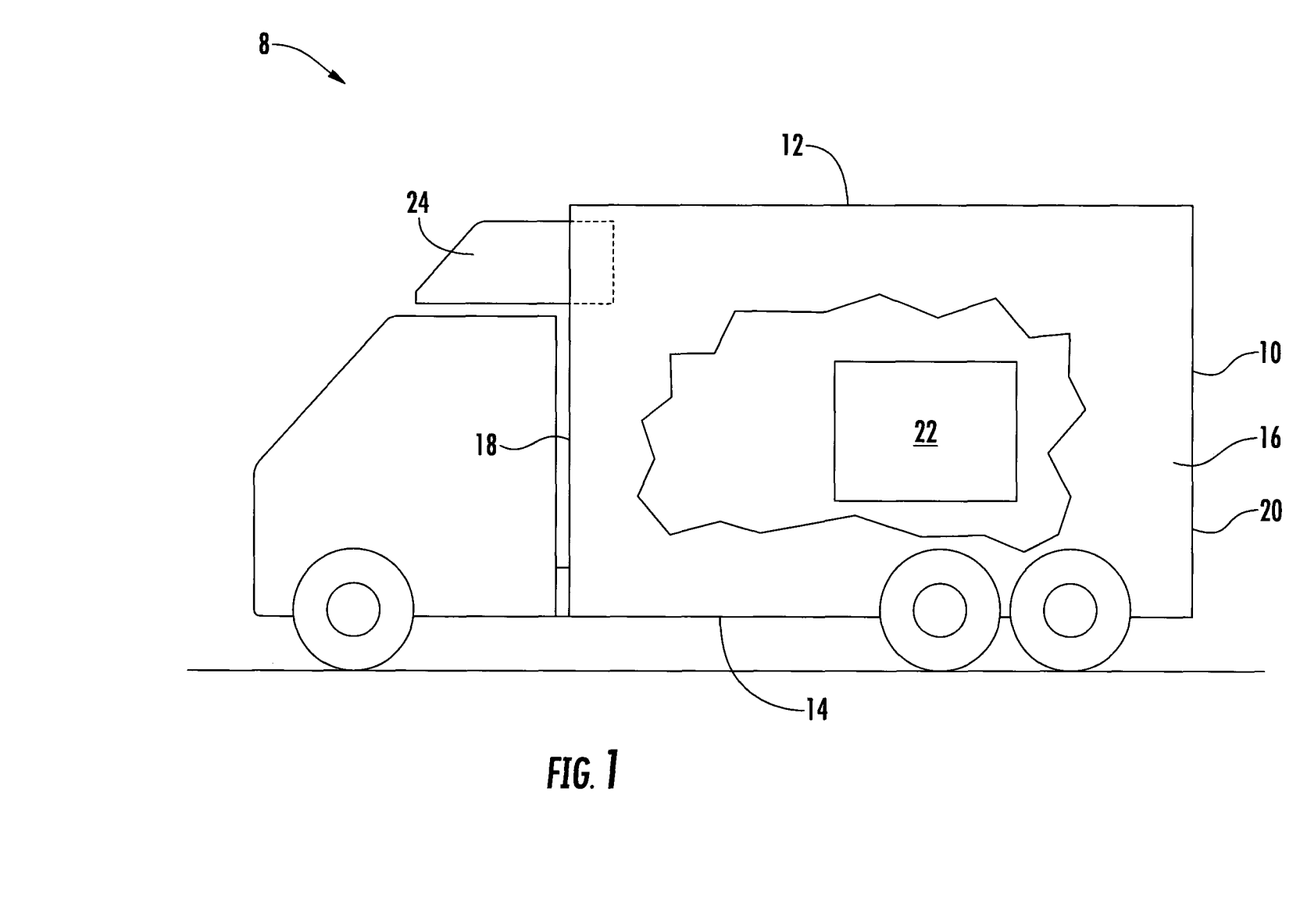
FIG. 1 is a schematic illustration of an embodiment of a refrigerated transportation cargo container.

Shown in FIG. 1 is an embodiment of a refrigerated truck 8 with a cargo space 10. The cargo space 10 is formed into a generally rectangular construction, with a top wall 12, a directly opposed bottom wall 14, opposed side walls 16 and a front wall 18. The cargo space 10 further includes a door or doors (not shown) at a rear wall 20, opposite the front wall 18. The cargo space 10 is configured to maintain a cargo 22 located inside the cargo space 10 at a selected temperature through the use of a refrigeration unit 24 located at the cargo space 10. It is to be appreciated that, while the description herein is related to a truck 8, one skilled in the art will readily recognize that the present disclosure may be applied to other refrigerated systems, for example, refrigerated cargo containers to transport cargo via, for example, a truck, a train or a ship.

Figure 2:
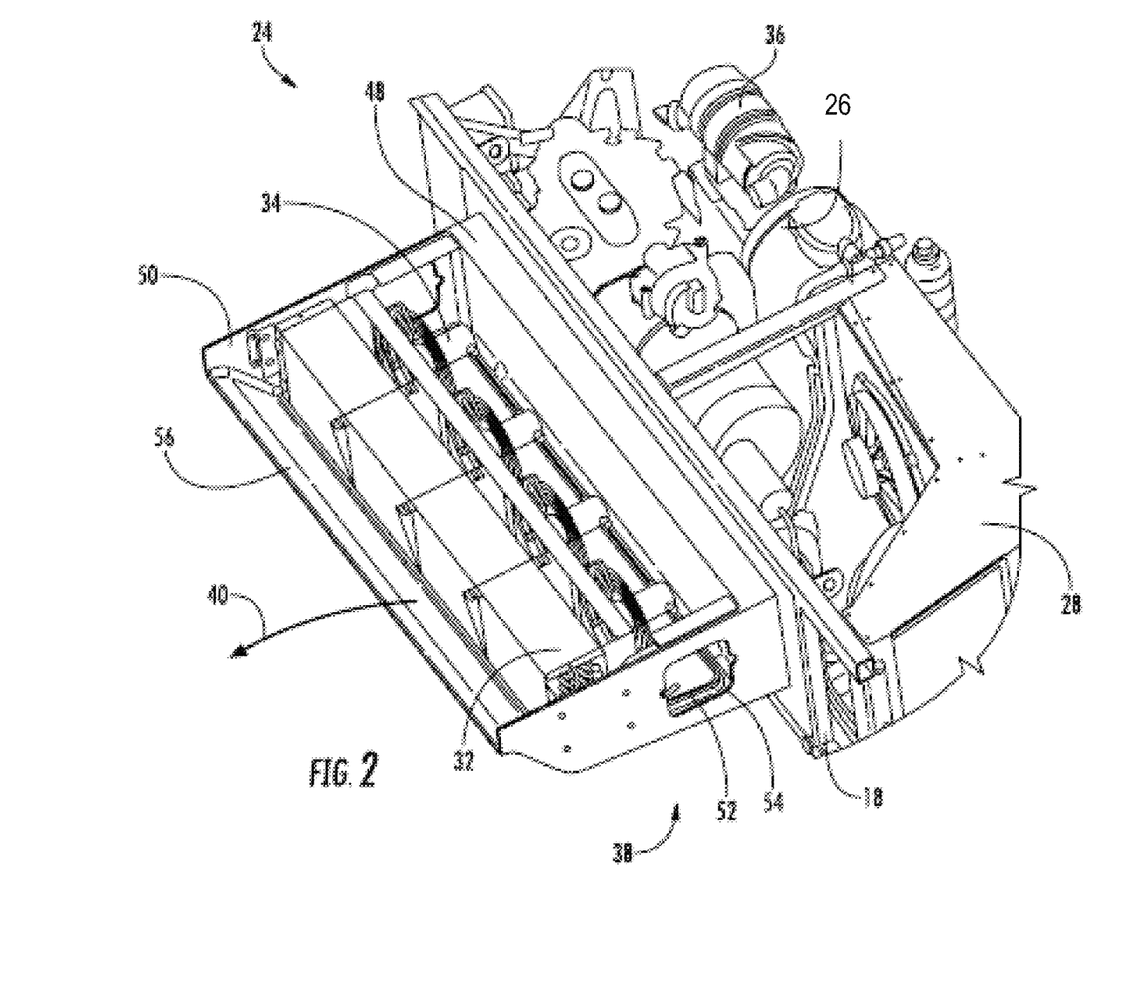
FIG. 2 is a schematic illustration of an embodiment of a refrigeration unit for a refrigerated transportation cargo container.

Referring now to FIG. 2, the refrigeration unit 24 is located at the front wall 18, and includes a compressor 26, a condenser 28, an expansion valve (not shown), an evaporator coil 32 and an evaporator fan 34. The compressor 26 is operably connected to an engine 36 which drives the compressor 26. The engine is connected to the compressor in one of several ways, such as a direct shaft drive, a belt drive, one or more clutches, or via an electrical generator. Return airflow 38 flows into the refrigeration unit 24 from the cargo space 10 through a housing inlet 52, and across the evaporator coil 32 via the evaporator fan 34, thus cooling the return airflow 38 to a selected temperature. The cooled return airflow 38, now referred to as supply airflow 40 is then supplied into the space 10 through a housing outlet 56, which in some embodiments is located near the top wall 12 of the cargo space 10. The supply air 40 cools the cargo 22 in the cargo space 10. It is to be appreciated that the refrigeration unit 24 can further be operated in reverse to warm the cargo space 10 when, for example, the outside temperature is very low.

The evaporator coil 32 and evaporator fan 34 are segregated from the remaining components and from the cargo 22 by a partition 48 to reduce undesired heating of the evaporator coil 32 and return airflow 38 by radiant heat from, for example, the condenser 28 and the engine 36. The evaporator coil 32 and evaporator fan 34 are located in an evaporator housing 50. The evaporator housing 50 includes the housing inlet 52, in some embodiments in a bottom portion 54 of the evaporator housing 50, and the housing outlet 56. Supply air 40 is circulated into the evaporator housing 50 via the housing inlet 52, across the evaporator coil 32 and out into the cargo space 10 via the housing outlet 56.

Figure 3:
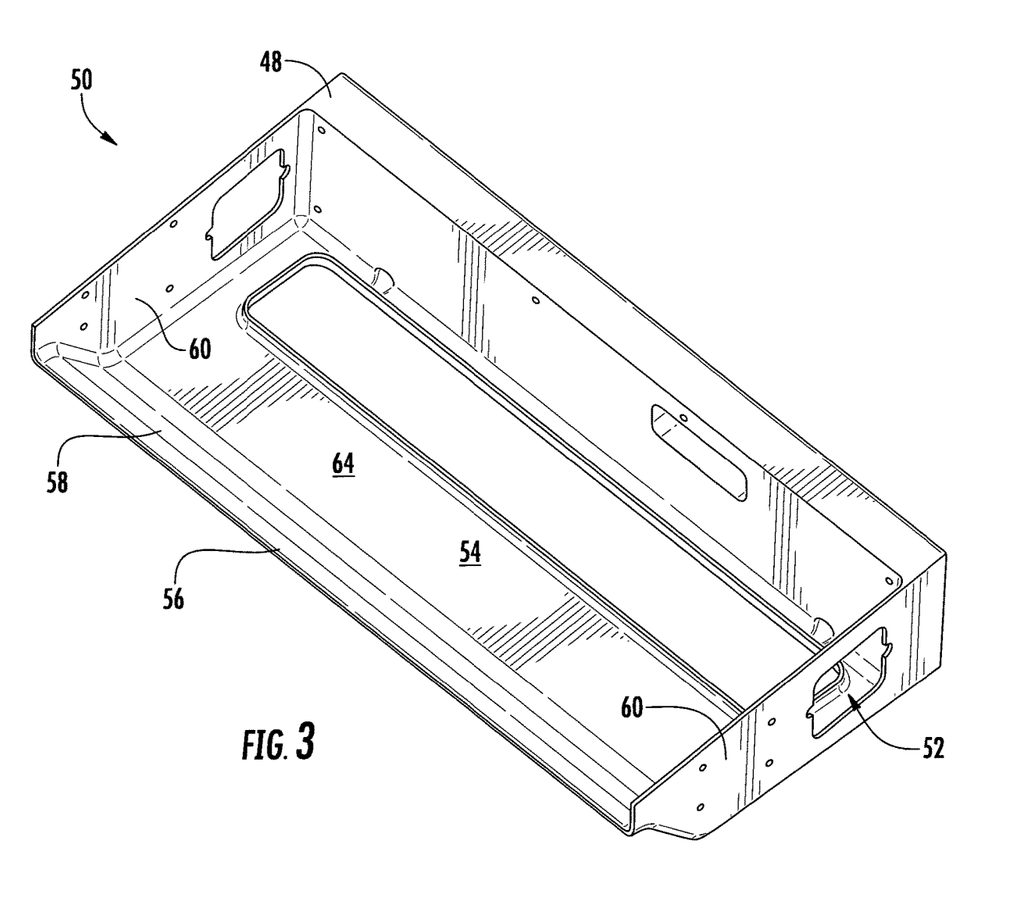
FIG. 3 is an illustration of an embodiment of an evaporator housing for a refrigerated transportation cargo container.

Referring to FIG. 3, the evaporator housing 50 disclosed herein is formed as a unitary structure including the partition 48, the bottom portion 54, an outlet portion 58 defining the housing outlet 56 and sidewall portions 60 at a lateral extent of the evaporator housing 50. The evaporator housing 50 may be formed as a single piece from materials such as a plastic or composite material, or alternatively a metal material such as aluminum.

Figure 4:
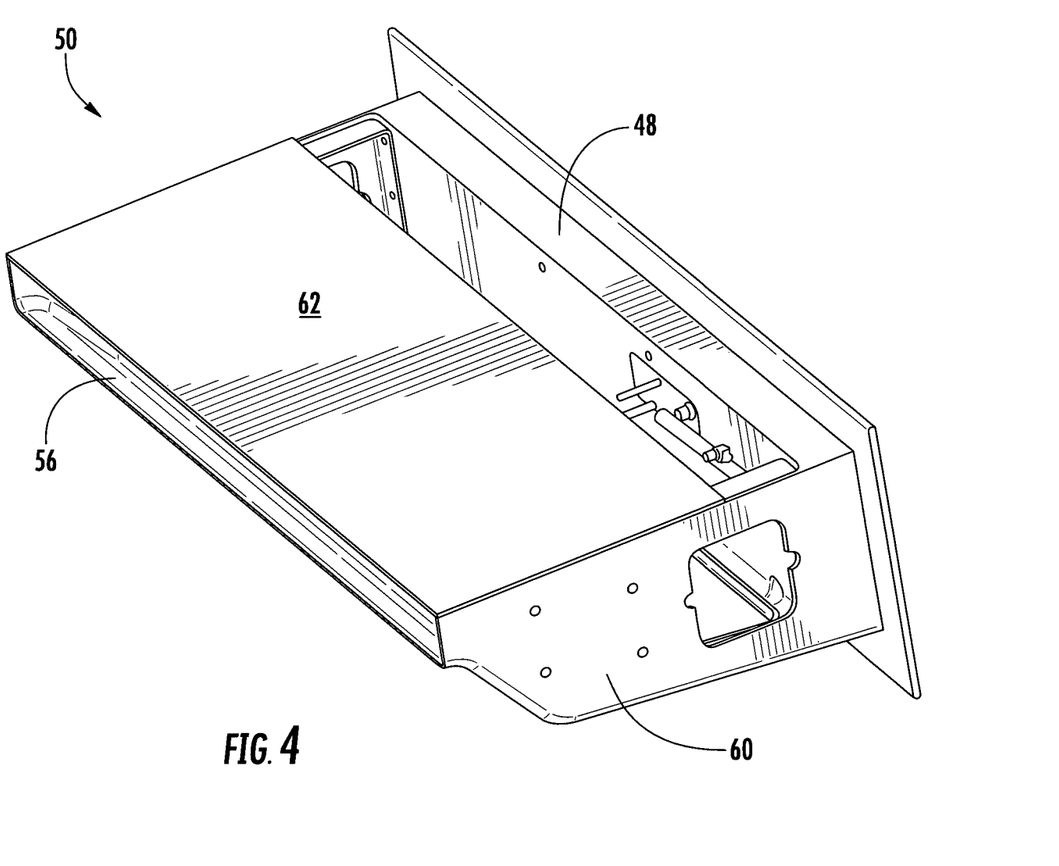
FIG. 4 is an illustration of an embodiment of an evaporator assembly for a refrigerated transportation cargo container.

As shown in FIG. 4, in some embodiments, a housing top cover 62 is fixed to the evaporator housing 50 to secure the components therein and to further define the housing outlet 56. It is to be appreciated that in some embodiments, such as those where the evaporator housing 50 abuts a top wall of the cargo space 10 such a housing top cover 62 may not be needed or desired. The housing top cover 62 is removable and replaceable to allow access to the evaporator components for service and maintenance, without complete disassembly.

Referring again to FIG. 2, in the embodiment shown four evaporator fans 34 are utilized, and the evaporator fans 34 are configured as "blowing fans". In particular, the evaporator fans 34 are located upstream of the evaporator coil 32 relative to the flow direction of return airflow 38 through the evaporator housing 50. The return airflow 38 enters the evaporator housing 50 and is blown across the evaporator coil 32 by the evaporator fans 34. While four evaporator fans 34 are shown, one skilled in the art will readily appreciate that other quantities of evaporator fans 34, such as two, three or six evaporator fans 34 may be utilized.

Figure 5:
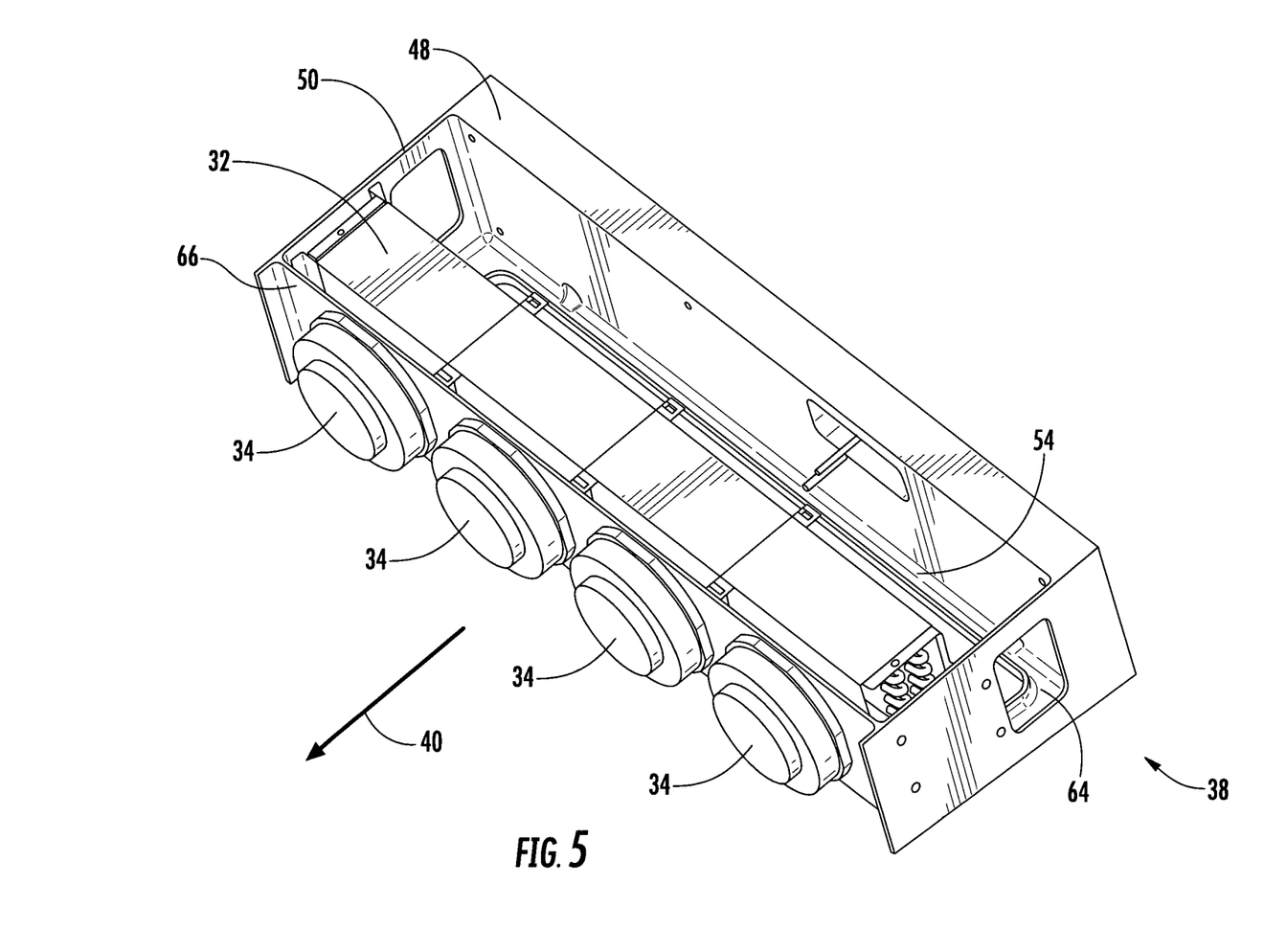
FIG. 5 is an illustration of another embodiment of an evaporator assembly for a refrigerated transportation cargo container.
Figure 6:
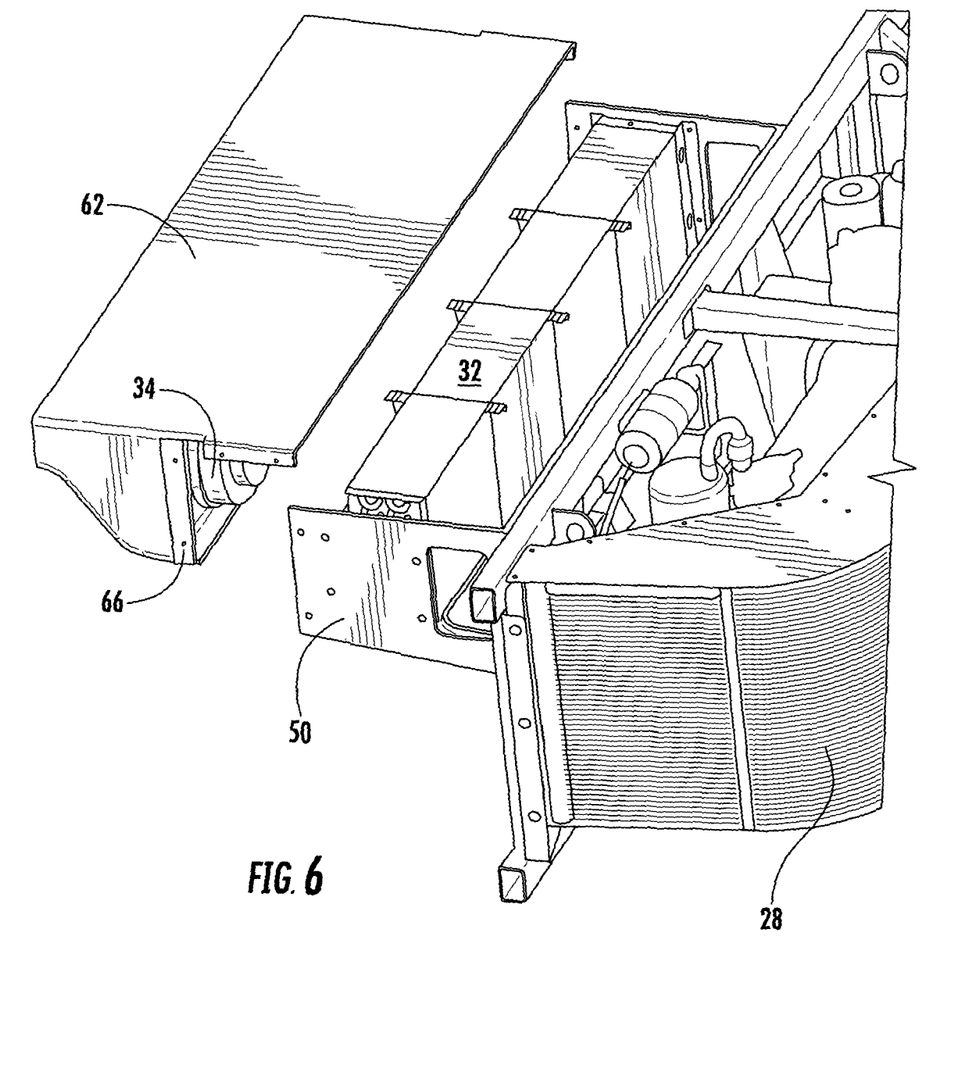
FIG. 6 is an illustration of yet another embodiment of an evaporator assembly for a refrigerated transportation cargo container.

Referring now to FIG. 5, in another embodiment the evaporator fans 34 are configured as "suction fans", with the evaporator fans 34 located downstream of the evaporator coil 32 relative to the flow direction of return airflow 38 through the evaporator housing 50. The return airflow 38 enters the evaporator housing 50 and is pulled across the evaporator coil 32 by the evaporator fans 34. Once across the evaporator coil 32, the return airflow 38 flows through the evaporator fans 34 and out of the evaporator housing 50 via the housing outlet 56 (shown in FIG. 4) as supply airflow 40. Utilizing evaporator fans 34 configured as suction fans reduces water splash from a drainage area 64 at the bottom portion 54 of the evaporator housing 50. The reduction in water splash reduces potential contamination of the cargo from such water. In some embodiments, a fan deck 66 for locating and securing the evaporator fans 34 may be included in the single piece formation of the evaporator housing 50. Alternatively, as shown in FIG. 6, the fan deck 66 may be included as part of the top cover 62. In this embodiment, the evaporator fans 34 are installed to the fan deck 66, then the top cover 62 including the fan deck 66 is installed to the evaporator housing 50.

The unitary evaporator housing 50 disclosed herein improves the time and cost associated with assembling the evaporator, while reducing the number of components. The removable top cover 62 allows for easy access to the components for service and repair. Further, the one piece construction allows for the use of lightweight materials such as plastics or composites saving weight of the assembly, which translates into lower cost of operation of the cargo space 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A transportation refrigeration unit to provide a flow of supply air to a selected space comprising:
   a compressor to compress a flow of refrigerant;
   an engine powered by a flow of fuel and operably connected to the compressor to drive the compressor;
   an evaporator circulating the flow of refrigerant therethrough to cool the supply air, the evaporator including:
      a unitary evaporator housing having a supply air inlet opening and a supply air outlet opening, the supply air inlet opening configured to admit an airflow from the selected space into the evaporator housing, the unitary evaporator housing including a bottom portion and two sidewall portions formed as a single piece, wherein the supply air inlet opening is disposed in a sidewall portion of the two sidewall portions of the unitary evaporator housing;
      an evaporator coil disposed in the evaporator housing, the flow of refrigerant circulating across the evaporator coil;
      an evaporator fan disposed in the evaporator housing to urge the airflow into the evaporator housing via the supply air inlet opening, across the evaporator coil and out of the evaporator housing through the supply air outlet opening, the evaporator fan oriented such that a central axis of the evaporator fan extends toward the evaporator coil and toward the supply air outlet opening; and
      a removable top cover affixed to the evaporator housing, the removable top cover extending over the evaporator coil and the evaporator fan, the removable top cover together with the bottom portion and the two sidewall portions defining the supply air outlet opening;
      wherein the evaporator fan is secured to the removable top cover such that the evaporator fan is removable from the evaporator housing with the removable top cover, while the evaporator coil remains in the evaporator housing;
      wherein the bottom portion is removable from the evaporator housing together with the evaporator fan and the removable top cover.

2. The transport refrigeration unit of claim 1, wherein the evaporator fan is located downstream of the evaporator coil relative to a direction of the airflow.

3. The transport refrigeration unit of claim 1, wherein the evaporator fan is secured to a fan deck formed integral with the evaporator housing.

4. The transport refrigeration unit of claim 1, wherein the evaporator fan is four evaporator fans.

5. The transport refrigeration unit of claim 1, wherein the evaporator fan is secured to a fan deck affixed to the removable top cover.

6. The transport refrigeration unit of claim 1, wherein the evaporator housing is formed from a plastic or composite material.

7. The transport refrigeration unit of claim 1, wherein the evaporator fan is located upstream of the evaporator coil relative to a direction of the airflow.

8. The transport refrigeration unit of claim 1, further comprising a partition positioned between the evaporator and the condenser, the partition formed integral to the evaporator housing.

9. An evaporator assembly for a transportation refrigeration unit comprising:
   a unitary evaporator housing having a supply air inlet opening and a supply air outlet opening, the unitary evaporator housing including a bottom portion and two sidewall portions formed as a single piece, wherein the supply air inlet opening is disposed in a sidewall portion of the two sidewall portions of the unitary evaporator housing to admit an airflow from a selected space into the evaporator housing;
   an evaporator coil disposed in the unitary evaporator housing circulating a flow of refrigerant therethrough;
   an evaporator fan disposed in the unitary evaporator housing to urge the airflow into the unitary evaporator housing via the supply air inlet opening, across the evaporator coil and out of the unitary evaporator housing through the supply air outlet opening into the selected space, the evaporator fan oriented such that a central axis of the evaporator fan extends toward the evaporator coil and toward the supply air outlet opening; and
   a removable top cover affixed to the unitary evaporator housing, the removable top cover extending over the evaporator coil and the evaporator fan, the removable top cover together with the bottom portion and the two sidewall portions defining the supply air outlet opening;
   wherein the evaporator fan is secured to the removable top cover such that the evaporator fan is removable from the evaporator housing with the removable top cover, while the evaporator coil remains in the evaporator housing;
   wherein the bottom portion is removable from the evaporator housing together with the evaporator fan and the removable top cover.

10. The evaporator assembly of claim 9, wherein the evaporator fan is located downstream of the evaporator coil relative to a direction of the airflow.

11. The evaporator assembly of claim 9, wherein the evaporator fan is secured to a fan deck formed integral with the evaporator housing.

12. The evaporator assembly of claim 9, wherein the evaporator fan is four evaporator fans.

13. The evaporator assembly of claim 9, wherein the evaporator fan is secured to a fan deck affixed to the removable top cover.

14. The evaporator assembly of claim 9, wherein the unitary evaporator housing is formed from a plastic or composite material.

15. The evaporator assembly of claim 9, wherein the evaporator fan is located upstream of the evaporator coil relative to a direction of the airflow.

16. A refrigerated truck comprising:

a truck having a cargo compartment; and a refrigeration unit operably connected to the cargo compartment to provide a flow of airflow to the cargo compartment comprising:

a compressor to compress a flow of refrigerant;

an engine powered by a flow of fuel and operably connected to the compressor to drive the compressor;

an evaporator circulating the flow of refrigerant therethrough to cool the airflow, the evaporator including:

a unitary evaporator housing having a supply air inlet opening and a supply air outlet opening, the unitary evaporator housing including a bottom portion and two sidewall portions formed as a single piece, wherein the supply air inlet opening is disposed in a sidewall portion of the two sidewall portions of the unitary evaporator housing to admit the airflow from the cargo compartment into the evaporator housing;

an evaporator coil disposed in the unitary evaporator housing, the flow of refrigerant circulating across the evaporator coil;

an evaporator fan disposed in the unitary evaporator housing to urge the airflow into the unitary evaporator housing via the supply air inlet opening, across the evaporator coil and out of the unitary evaporator housing through the supply air outlet opening into the cargo compartment, the evaporator fan oriented such that a central axis of the evaporator fan extends toward the evaporator coil and toward the supply air outlet opening; and         a removable top cover affixed to the unitary evaporator housing, the removable top cover extending over the evaporator coil and the evaporator fan, the removable top cover together with the bottom portion and the two sidewall portions defining the supply air outlet opening;

wherein the evaporator fan is secured to the removable top cover such that the evaporator fan is removable from the evaporator housing with the removable top cover, while the evaporator coil remains in the evaporator housing;

wherein the bottom portion is removable from the evaporator housing together with the evaporator fan and the removable top cover.

17. The refrigerated truck of claim 16, wherein the evaporator fan is located downstream of the evaporator coil relative to a direction of the airflow.

\* \* \* \* \*